Dec. 25, 1934. D. B. GISH 1,985,494
HOSE COUPLING AND METHOD OF SECURING THE SAME TO A HOSE
Filed Sept. 12, 1934
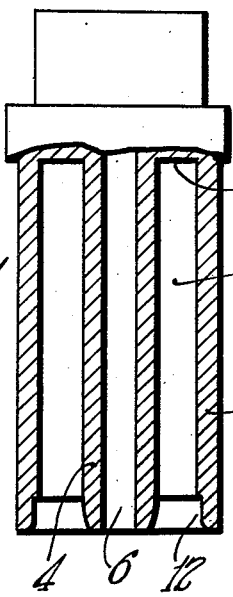
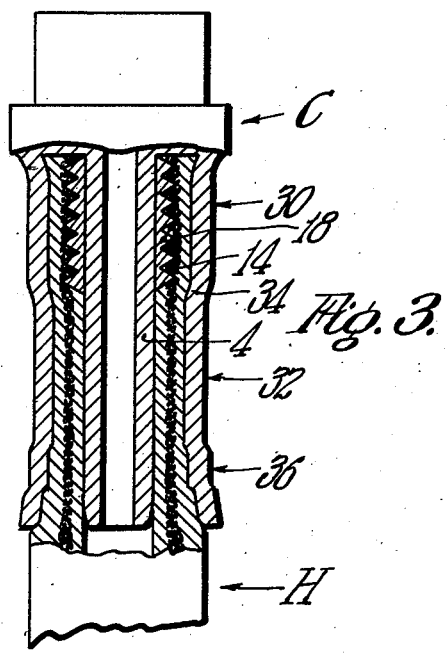
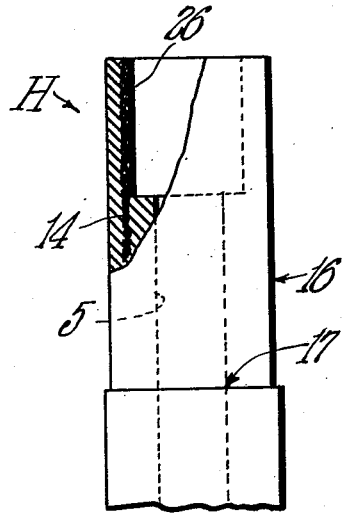
INVENTOR.
Daniel B. Gish.
BY
Watt C Ross
ATTORNEY.

Patented Dec. 25, 1934

1,985,494

UNITED STATES PATENT OFFICE 1,985,494

HOSE COUPLING AND METHOD OF SECURING THE SAME TO A HOSE

Daniel B. Gish, Springfield, Mass.

Application September 12, 1934, Serial No. 743,688

4 Claims. (Cl. 285—84)

This invention relates to improvements in hose couplings and is directed more particularly to improvements in couplings for high-pressure hose and the method of securing the same to a hose.

The principal objects of the invention are directed to the provision of a novel coupling and method of securing the same to a hose in such a way that the hose and coupling are firmly held in secured-together relation and are adapted to withstand high pressures and facilitate manipulation of the hose without liability of rupture at, or near, the coupling.

According to special features of the invention, a hose is fitted into a compressible coupling of novel form and the coupling is compressed by means of hydraulic pressure to deform the coupling so that it is attached to the hose in a secure manner, all as will hereinafter appear.

Various other novel objects and advantages of the invention will hereinafter appear from the following description of the present preferred form of the invention, reference being had to the accompanying drawing, wherein:

Fig. 1 is a sectional elevational view of a coupling embodying certain novel features of the invention;

Fig. 2 is a side elevational view of the end portion of a hose partly in section to which the coupling, shown in Fig. 1, is secured;

Fig. 3 is a partial sectional elevational view of the coupling of Fig. 1 and hose of Fig. 2 shown in secured-together relation;

Fig. 4 is an elevational view of a bushing of the invention;

Fig. 5 is a plan view of the same, and

Fig. 6 is a view similar to Fig. 1 showing a modified form of the coupling of the invention.

Referring now to the drawing more in detail, the invention will be fully described.

A coupling is represented by C which is formed to have a tail-piece 4 and a skirt or wall 8. The tail-piece and wall are preferably integral. The tail-piece 4 has an opening 6 therethrough and a groove 10 is formed between the tail-piece 4 and skirt 8 by the spacing apart thereof.

The lower end of the skirt 8 is preferably bored out as at 12 to provide a recess or inner diameter which is slightly greater than that of the main body of the said skirt thereabove. The outer diameter of the tail-piece 4 of the coupling is preferably such that it will fit within an opening 5 of the hose now to be described.

An end portion of a hose is represented at H in Fig. 2 which, as usual, has a bore 5. The hose H may be of the usual high-pressure construction such as is commonly used in connection with lubricating apparatus. One form of such a hose is a combination of a tubular body of rubber or other plastic material and a reinforcement in the walls of the body which may be formed by windings or braidings of wires indicated generally by 14.

The endmost and outer, or covering, portion of the hose is ground off or scarfed as at 16 as shown to provide a uniform diameter that will fit within the skirt in a proper manner and this scarfing in most cases forms a shoulder such as 17. The said end of the hose when ground or scarfed may be slipped into the coupling C with the tail piece 4 inserted in the bore 5 of the hose while the endmost portion of the hose abuts the surface or end 11 of the groove 10, the wall of the hose being between the tail-piece and wall of the coupling.

The hose is scarfed to remove irregularities on its outer surface as well as to provide a uniform outer diameter so that when the hose is slipped into the coupling it fits the space between the tail piece and skirt with the shoulder 17 thereof concealed within the recess 12.

A bushing 18 is provided which may be separate from the tail piece. This is preferably bored out as shown for fitting over the tail piece 4 and is preferably formed to have projections or barbs 20 and grooves 22. The projections and grooves may be formed in various ways and, if desired, the said bushing may be split as at 24 so that it may be made to fit tightly on the tail-piece. In another way, a coupling 50 such as shown in Fig. 6 may have a skirt 52 and tail-piece 54 with grooves and projections 58 and 56 associated with the said tail-piece.

The inner bore of the hose at its endmost part is preferably enlarged as at 26 as by removing the material of the hose. This is to more or less expose the reinforcement of the hose and provide an enlarged bore for receiving the bushing or the projections and grooves.

In assembling the hose and coupling, the end of the hose H is slipped into the coupling C with the bushing 18 in the end of the hose and around the tail-piece 4, the end of the hose preferably bottoming in the groove between the tail-piece 4 and skirt or wall 8 of the coupling and with the shoulder 17 of the hose well up in the recess 12 at the lower end of the coupling. With the hose and coupling assembled as described the coupling is then secured to the hose by pressing the skirt inwardly in a certain way.

The pressing is accomplished according to the invention by hydraulic pressure and is done by placing the coupling between suitable dies which are actuated by hydraulic pressure. The dies are so arranged that when pressure is applied to the coupling it is deformed or compressed as shown in Fig. 3.

That is, the skirt of the coupling is pressed inwardly to decrease its diameter, whereby one part is of a different diameter than another part to produce different effects. For instance, the coupling at a point indicated by 30 is reduced in diameter so as to compress the end portion of the hose and force the reinforcing wires 14 into the grooves 22 of the bushing 18 whereby the wires, grooves and projections are interlocked so that the end of the hose is locked securely in the coupling.

Just below and at a point indicated by 32 the coupling is reduced in diameter to a greater extent than at point 30 to form a more or less of a shoulder part 34 which holds the bushing 18, interlocked with the reinforcement 14, from being pulled downwardly of the coupling. Where the bushing is slotted as shown, it will firmly grip the tail piece since it is adapted to be compressed although the slotting may not be necessary in all cases as it will be bound more or less to the tailpiece.

A part of the skirt indicated at 36 is compressed less than the part above it to relieve the hose somewhat of pressure near the lower end of the coupling. This is so the hose will not be ruptured and may bend more or less at this point without injury when the hose is in use.

It is a special feature of the invention that the coupling is compressed by means of hydraulic or fluid pressure as distinguished by operations performed by a power press or where a coupling member is drawn, swedged or rolled onto a hose.

In the fitting of hose to a tubular member by the usual grinding of the hose, it will be at once apparent that it is difficult to provide any great number of couplings with exactly similar internal diameters or to scarf any great number of pieces of hose so that they have the same external diameters. Therefore, with a number of hose lengths and couplings having varying diameters, the couplings can not be secured to the hose in a uniformly satisfactory manner by the use of a power press, by drawing, swedging, rolling, or similar operations.

This is for the obvious reason that in all such operations, the coupling must be and is pressed to certain fixed diameters. Since the two elements to be joined are of varying diameters to begin with, the results are necessarily non-uniform when the coupling is pressed to certain diameters. It is, of course, desirable for best results that the coupling be secured to the hose uniformly.

By the use of hydraulic pressure, it is possible to use a certain predetermined pressure for compressing the coupling and then regardless of the individual variations mentioned, there will be uniformity in the finished product. That is to say, the compression on the couplings will be uniform so that the securing is uniform.

The apparatus for hydraulically compressing the coupling may take some well-known form and it will suffice to say that the coupling is compressed or reduced in diameter at one or more points as described by means of hydraulic pressure.

The method described provides a positive lock for the hose and coupling and is very desirable in that it obviates the possibility that the hose might become loose from or detached from the coupling when strains are applied to the hose while the hose is not ruptured at the end of the coupling and may bend at this point without rupture. The features of the invention are particularly adapted for high-pressure service in connection with greasing apparatus where the hose is necessarily subjected to severe strains and is called upon to support apparatus such as grease guns or the like. The necessity for a secure attachment of hose and coupling is therefore obviously necessary and is accomplished by means of the invention.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A combined hose and coupling, the said hose having reinforcement in the wall thereof with the inner portion of the wall removed adjacent the end of the hose to provide an enlarged bore, the said coupling including a tail-piece within the bore of the hose and interlocking means for the reinforcement within the bore of the hose at its end and a skirt surrounding the hose which is compressed to squeeze the wall of the hose between it and said tail-piece, the said interlocking means including a bushing on said tail-piece having grooves and projections.

2. The combination of a hose having a reinforced wall with a portion of its inner wall removed at the end of its bore to substantially expose the reinforcement and a coupling comprising, a tail-piece extending into the bore of the hose and having interlocking means associated therewith including recesses and projections adapted to contact said exposed reinforcement, and a skirt connected at its upper end to the upper end of the tail-piece which when compressed around said hose forces the exposed part of said reinforcement into intimate engagement with said recesses of said tail piece and squeezes the wall of said hose between the skirt and tail-piece.

3. The combination of a hose having a reinforced wall with a portion of its inner wall removed at the end of its bore to substantially expose the reinforcement to provide an enlarged end bore and a coupling comprising, a tail-piece extending into the bore of the hose and having interlocking means associated therewith including recesses and projections adjacent the said reinforcement of greater over-all diameter than that of the tail-piece therebelow, and a skirt connected at its upper end to the upper end of the tail-piece which when compressed around said hose with a consequent reduction in diameter squeezes the wall of the hose between the skirt and tail-piece to lock the reinforcement, recesses and projections, the compression being such that a zone of least diameter is formed immediately beyond that portion of the tail-piece having the greatest diameter.

4. A coupling for a hose comprising in combination, a central tail-piece and an outer annular wall rigidly connected at their upper ends, interlocking means at the upper end of the tail-piece in the form of a removable bushing around said tail-piece having recesses and projections, the over-all diameter of which projections is greater than that of the tail-piece below the bushing and the said wall being spaced from the projections and tail-piece and co-operating therewith to form an annular groove open at the lower end of the coupling which is of relative greater width below the bushing than around said bushing whereby a hose having the end portion of its bore enlarged may be inserted in said groove with the interlocking means in the said enlarged bore of the hose.

DANIEL B. GISH.